Patented Jan. 25, 1949

2,459,913

UNITED STATES PATENT OFFICE 2,459,913

METALLIZABLE TETRAKISAZO DYE

Werner Bossard, Basel, Switzerland, assignor to the firm J. R. Geigy A. G., Basel, Switzerland, a Swiss firm No Drawing. Application February 26, 1945, Serial No. 579,898. In Switzerland April 4, 1944

1 Claim. (Cl. 260—166)

I have found that new valuable polyazo dyestuffs are obtained by combining diazotised amino-disazo dyestuffs of the general formula

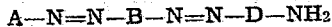

$$A-N=N-B-N=N-D-NH_2$$

wherein A means a benzene radical, in which one hydroxyl group and one carboxylic group stand in o-position to each other, and B and D mean radicals of the benzene or naphthalene series, with monoazo dyestuffs which are formed by acid coupling o-carboxy diazonium compounds of the benzene series, which may be substituted in any way, with 2-amino-5-hydroxynaphthalene-7-sulfonic acid. The aminodisazo dyestuffs used as starting products can be produced according to various methods. Thus for instance an amino-salicylic acid, like 4- or 6-amino-1-hydroxybenzene-2-carboxylic acid or their sulfonic acids, may be diazotised and coupled with an amine of the benzene or naphthalene series coupling in p-position to the amino group, the obtained aminoazo dyestuff being further diazotised and combined with the same or with another primary aromatic amine coupling in p-position to the amino group in order to obtain the aminodisazo dyestuff. Another method consists in coupling a diazotised aromatic 3- or 4-aminonitro- or 3- or 4-aminoacetyl-amino-compound with salicylic acid, converting the resulting nitromonoazo dyestuff by reduction or the acetylaminomonoazo dyestuff by saponification into the aminomonoazo dyestuff, diazotising the same and combining the so-obtained diazomonoazo dyestuff with a primary amine of the benzene or naphthalene series coupling in p-position to the amino group. Furthermore, it is possible to tetrazotise an aromatic diamine and to couple the tetrazo compound first on one half side with salicylic acid and to couple then the intermediate product with a primary amine of the benzene or naphthalene series coupling in p-position to the amino group, whereby the aminodisazo dyestuff is produced.

The components A, B and D used for the production of the dyestuffs may contain still other substituents, beside the substituents required according to the above definition. As other substituents may be enumerated especially solubilising groups, such as sulfonic acid or carboxylic acid groups.

Dyestuffs with especially good properties are obtained, if the radical D contains, in o-position to the diazotisable amino group, alkoxy groups, such as —OCH$_3$, —OC$_2$H$_5$ or —OCH$_2$COOH etc., these alkoxy groups being substituted, if desired.

The aminodisazo dyestuffs obtainable according to anyone of the said methods are diazotised in the usual manner and combined in an alkaline medium, if necessary in the presence of pyridine, with the monoazo dyestuffs according to the above definition, the tetrakisazo dyestuffs being thus formed. When applying these dyestuffs according to the methods usual for dyestuffs with direct affinity to cellulosic fibres, like cotton and other vegetable fibres or artificial silks and staple fibres obtainable from regenerated cellulose, the said fibres are dyed in grey-blue to green shades.

Especially valuable dyeings are produced by after-treating the new dyestuffs on the fibres with metal-yielding agents. The treatment of the polyazo dyestuffs with copper-yielding agents can be carried out on the fibres for instance in a neutral or slightly acetic acid bath by means of usual copper salts, such as copper sulfate. If desired, one may also use copper compounds which are stable to alkalis and obtainable for instance by interacting copper salts with aliphatic hydroxy carboxylic acids, e. g. with tartaric acid, in a soda-alkaline bath. In all these cases the after-treatment with copper-yielding agents can be executed in the dye-bath or in a new bath.

Instead of with the cited copper compounds, the dyeings can be after-treated according to known methods also with other metal-yielding agents, like for example with chromium, cobalt, manganese or nickel salts.

Dyestuffs having an excellent light-fastness are obtained by converting the tetrakisazo dyestuffs in substance by means of copper compounds into the copper complex compounds. This operation can be carried out according to known methods, in an acid, neutral or alkaline medium, by means of salts, hydroxides or oxides of copper, if desired with suitable additions, like alkali acetates or tartrates, in the presence or absence of organic solvents or diluents, like alcohol, glycerine or pyridine, under usual or increased pressure.

Finally, it is also possible to treat the metal-free dyestuffs, obtainable according to this invention and being capable of being twice metallised, only with one molecule of a copper-yielding agent, to use the incompletely coppered compounds for dyeing purposes and to after-treat the resulting dyeings with an agent yielding copper or another metal.

The metal-containing dyeings obtainable on cellulosic fibres according to any one of the said methods with the dyestuffs claimed herein possess red to greenish-grey shades of very good fastness properties.

The present invention will now be illustrated by the following examples, without being limited thereto; the parts are by weight.

Example 1

15.3 parts of 1-amino-4-hydroxybenzene-3-carboxylic acid are diazotised in the usual manner and coupled with 22.3 parts of a mixture of 1-aminonaphthalene-6- and -7-sulfonic acid. The resulting monoazo dyestuff is made alkaline with sodium carbonate, treated with 7 parts of sodium nitrite and diazotised by pouring thereinto 40 parts of concentrated hydrochloric acid. The diazonium compound thus precipitated is filtered off, suspended with cold water and coupled with a hydrochloric acid solution of 13.7 parts of 1-amino-2-methoxy-5-methylbenzene in the presence of sodium acetate. Then the combination mixture is neutralised with a sodium carbonate solution, salted out and the aminodisaz dyestuff thus separated is filtered. It is hot dissolved in 500 parts of water, mixed with 6 parts of sodium nitrite and diazotised at 0° C. with 40 parts of hydrochloric acid. After some hours the formed diazonium compound is combined in the presence of an excess of ammonia with 40 parts of the monoazo dyestuff obtainable by acid coupling diazotised 5-chloro-2-aminobenzoic acid with 2-amino-5-hydroxynaphthalene-7-sulfonic acid. On the next morning the resultant product is heated to 80° C., salted out with sodium chloride, the resulting precipitate being filtered off, washed with brine and dried. The new dyestuff, which is a dark bronzing powder, is soluble in water with a reddish-blue coloration and in concentrated sulfuric acid with a bluish-grey coloration. It dyes cellulosic fibres in bluish-grey shades being transformed into grey shades of good fastness to light and to washing by an after-treatment with copper sulfate or with basic chromi-sulfate.

Instead of 1-amino-2-methoxy-5-methylbenzene used as the second middle component in this example, it is also possible to use 1-amino-2-ethoxy-5-methyl-benzene.

If the monoazo dyestuff obtained by the acid coupling of diazotised 5-chloro-2-aminobenzoic acid with 2-amino-5-hydroxynaphthalene-7-sulfonic acid is replaced by a monoazo dyestuff obtainable from 2-amino-5-hydroxynaphthalene-7-sulfonic acid and diazotised 2-aminobenzoic acid, 5-nitro-2-aminobenzoic acid, 4-methyl-2-aminobenzoic acid, 3-chloro-2-aminobenzoic acid, 3:6-dichloro-2-aminobenzoic acid, 5-acetylamino-2-aminobenzoic acid or 5-cyano-2-aminobenzoic acid and the like, dyestuffs having similar properties are obtained.

Example 2

25.7 parts of 4-amino-4'-hydroxyazobenzene-3'-carboxylic acid, obtained by coupling 4-acetylamino-1-diazobenzene with salicylic acid and by subsequent saponification, are diazotised in the usual way and combined with a hydrochloric acid solution of 13.7 parts of 1-amino-2-methoxy-5-methylbenzene. The coupling is accelerated by dropwise adding a sodium acetate solution. The finished aminodisaz dyestuff is salted out in an alkaline solution, filtered off, dissolved with caustic soda lye, mixed with 7.5 parts of sodium nitrite and diazotised by causing this solution to run at 20° C. into an excess of hydrochloric acid. As soon as the diazotisation is complete, the difficultly soluble diazonium compound is filtered off, suspended in ice-water and combined with 39 parts of the monoazo dyestuff, obtained by acid coupling diazotised 5-nitro-2-aminobenzoic acid with 2-amino-5-hydroxynaphthalene-7-sulfonic acid, in 300 parts of water, 150 parts of pyridine and in 25 parts of a concentrated ammonia solution. The finished tetrakisazo dyestuff is precipitated with sodium chloride, filtered and the pressed cake is washed with brine and dried. It forms a dark bronzy powder which dissolves in water with a violetish-grey coloration and in concentrated sulfuric acid with a bluish-grey coloration. When after-treated with copper sulfate, it produces, on vegetable fibres, reddish-grey dyeings of excellent fastness properties in the moist state.

By using, instead of the 4-amino-4'-hydroxyazobenzene-3'-carboxylic acid, the 3-amino-4'-hydroxyazobenzene-3'-carboxylic acid or the 4-amino-4'-hydroxyazobenzene-3-sulfo-3'-carboxylic acid or the 4-amino-4'-hydroxyazobenzene-5'-sulfo-3'-carboxylic acid or, as final component, instead of the monoazo dyestuff from diazotised 5-nitro-2-aminobenzoic acid and 2-amino-5-hydroxynaphthalene-7-sulfonic acid, another one of the monoazo dyestuffs mentioned in Example 1 dyestuffs of similar properties are obtained.

Example 3

15.3 parts of 1-amino-4-hydroxybenzene-3-carboxylic acid are diazotised and coupled in a slightly acetic acid solution with 22.3 parts of 1-aminonaphthalene-7-sulfonic acid. The resultant product is made just alkaline to litmus by means of sodium carbonate, mixed with 7 parts of sodium nitrite, whereupon 40 parts of concentrated hydrochloric acid are poured thereinto at 10° C. After completion of the diazotation the diazonium compound thus precipitated is filtered off, suspended in ice-water and coupled with 25.4 parts of 1-amino-2-methoxy-naphthalene-6-sulfonic acid in the presence of 15 parts of sodium acetate. On the next morning the combination mixture is neutralized with sodium carbonate and the dyestuff salted out with sodium chloride. For the purpose of diazotation the pressed cake is dissolved with the required quantity of water, treated with 7 parts of sodium nitrite and caused to run in the cold into an excess of dilute hydrochloric acid. The diazo compound is precipitated in sodium chloride, filtered off and, after suspension with ice-water, coupled in the presence of 20 parts of 25% ammonia and of 150 parts of pyridine with the monoazo dyestuff obtainable by acid coupling 13.7 parts of diazotised anthranilic acid with 23.9 parts of 2-amino-5-hydroxynaphthalene-7-sulfonic acid. After completion of the dyestuff formation sodium chloride is added, the precipitated dyestuff is filtered off and dried. It constitutes a dark bronzy powder which is soluble in water with a bluish-green coloration and in concentrated sulfuric acid with a pure blue coloration. The dyestuff dyes fibres from natural or regenerated cellulose in greyish-green shades which, on after-treatment with copper or chromium salts are transformed into fast greenish-grey shades.

When, instead of 1-amino-2-methoxynaphthalene-6-sulfonic acid, the 1-aminonaphthalene-6- or 7-sulfonic acid is used as second middle component for the production of the tetrakisazo dyestuffs, dyestuffs will be obtained which, if applied according to the dyeing methods which are usual for dyestuffs having direct affinity to cellulosic fibres, dye the said fibres in bluish-green shades which, on after-treatment with copper or trivalent chromium or cobalt salts, only vary their shades in an immaterial manner, but become considerably improved with respect to their fastness properties to light and in the moist state.

*Example 4*

38.7 parts of the monoazo dyestuff obtainable from diazotised 1-amino-4-hydroxybenzene-3-carboxylic acid and 1-aminonaphthalene-7-sulfonic acid are diazotised in the manner described in Example 3 and coupled in a slightly acetic acid medium with a hydrochloric acid solution of 15.3 parts of 1-amino-2:5-dimethoxybenzene. The finished aminodisazo dyestuff is salted out from a solution which is alkaline to litmus and is filtered off. The bronzy pressed cake is dissolved in the required quantity of water, mixed with 6.9 parts of sodium nitrite and diazotised by adding rapidly 40 parts of concentrated hydrochloric acid. After some hours the formation of the diazonium compound is complete. The same is combined, in the presence of 25 parts of 25% ammonia, with the monoazo dyestuff made by acid coupling diazotised 5-nitro-2-aminobenzoic acid with 2-amino-5-hydroxynaphthalene-7-sulfonic acid. For the precipitation the tetrakisazo dyestuff is heated to 80° C. and treated with sodium chloride. The precipitate is now filtered off, washed with brine and dried. The dyestuff thus obtained, and to which the appended claim is specifically directed, constitutes a dark powder which dissolves in water with a blue coloration and in concentrated sulfuric acid with a bluish-grey coloration. Cellulosic fibres can directly be dyed in light-fast, greyish-blue shades which are only immaterially changed by an after-treatment with chromi- or copper salts, but are substantially improved with respect to their fastness properties in the moist state.

Instead of 1-amino-2:5-dimethoxybenzene as second middle component also 1-amino-2:5-diethoxybenzene may be used.

*Example 5*

25.7 parts of 4-amino-4'-hydroxyazobenzene-3'-carboxylic acid are diazotised in the usual manner and coupled in an acetic acid solution with 25.3 parts of 1-amino-2-methoxynaphthalene-6-sulfonic acid. The finished aminodisazo dyestuff is filtered off, dissolved with sodium carbonate in the required quantity of water, intermixed with 7 parts of sodium nitrite and diazotised in the cold by pouring 60 parts of concentrated hydrochloric acid into this solution. The diazonium compound thus precipitated is isolated, suspended in 200 parts of water and coupled, in the presence of 25 parts of ammonia and 150 parts of pyridine, with 39 parts of the monoazo dyestuff made by coupling diazotised 5-nitro-2-aminobenzoic acid with 2-amino-5-hydroxynaphthalene-7-sulfonic acid in an acid solution. The tetrakisazo dyestuff thus separated is filtered off and washed with dilute brine. The dyestuff dyes fibres from natural or regenerated cellulose, after an after-treatment with copper-yielding substances, in greenish-grey shades of good fastness properties.

A similar dyestuff is obtained by using, instead of 4-amino-4'-hydroxyazobenzene-3'-carboxylic acid, the monoazo dyestuff obtainable by coupling diazotised 1-amino-4-hydroxybenzene-3-carboxylic acid with 1-amino-2-methoxy-5-methylbenzene.

*Example 6*

23.3 parts of 1-amino-2-hydroxy-5-sulfo-3-benzoic acid are diazotised, combined with 14.3 parts of 1-aminonaphthalene, the aminoazo dyestuff is further diazotised and the resulting diazoazo compound coupled, in the presence of 20 parts of sodium acetate, with a hydrochloric acid solution of 15.3 parts of 1-amino-2:5-dimethoxybenzene. On the next morning the amino-disazo dyestuff is salted out from an alkaline solution, filtered off, dissolved in hot water and, after mixing with 7 parts of sodium nitrite at 5° C., poured into an excess of dilute hydrochloric acid. After some hours the diazotation is complete. Now, coupling is effected with 39 parts of a soda-alkaline solution of the monoazo dyestuff obtainable by coupling 1-aminobenzene-2:4-dicarboxylic acid in an acid solution with 2-amino-5-hydroxynaphthalene-7-sulfonic acid. The tetrakisazo dyestuff separated in the usual manner forms a dark powder which dissolves in water with a blue coloration and in concentrated sulfuric acid with a greyish-blue coloration. It dyes cotton and regenerated cellulose in bluish-grey shades which, on treatment with copper salts either in the dye-bath or by after-coppering according to known methods, become greatly improved with regard to their fastness properties, without changing materially their shades.

When, instead of the monoazo dyestuff obtained by acid coupling of diazotised 1-aminobenzene-2:4-dicarboxylic acid and 2-amino-5-hydroxynaphthalene-7-sulfonic acid, another monoazo dyestuff made for instance from 2-amino-5-hydroxynaphthalene-7-sulfonic acid and diazotised 1-aminobenzene-2:5-dicarboxylic acid or 1-amino-4-sulfo-2-benzoic acid or another monoazo dyestuff mentioned in Example 1 is used, one obtains final products having similar properties.

What I claim is:

The polyazo dyestuff capable of being metallised, corresponding in the free state to the formula

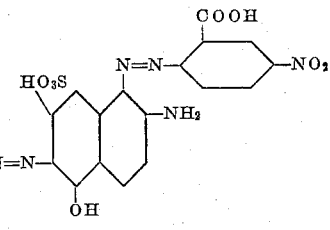

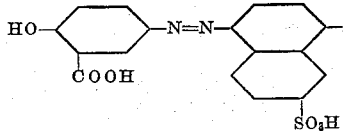

WERNER BOSSARD.

REFERENCES CITED

The following references are of record in the file of this patent:

UNITED STATES PATENTS

| Number | Name | Date |
|---|---|---|
| 1,829,672 | Richard | Oct. 27, 1931 |
| 1,851,119 | Straub | Mar. 29, 1932 |
| 1,878,548 | Schweitzer | Sept. 20, 1932 |
| 2,215,087 | Schweitzer | Sept. 17, 1940 |
| 2,228,321 | Messmer | Jan. 14, 1941 |
| 2,270,675 | Stein et al. | Jan. 20, 1942 |